United States Patent
Muramatsu et al.

(10) Patent No.: US 7,496,922 B2
(45) Date of Patent: Feb. 24, 2009

(54) COMMUNICATION TERMINAL AND PROGRAM THEREFOR

(75) Inventors: Naoki Muramatsu, Chiba (JP); Keiko Hirayama, Yokohama (JP); Nobushige Yamada, Tokyo (JP)

(73) Assignee: NTT DoCoMo, Inc., Tokyo (JP)

( * ) Notice: Subject to any disclaimer, the term of this patent is extended or adjusted under 35 U.S.C. 154(b) by 0 days.

(21) Appl. No.: 10/584,420

(22) PCT Filed: Dec. 22, 2004

(86) PCT No.: PCT/JP2004/019705

§ 371 (c)(1),
(2), (4) Date: Jun. 4, 2007

(87) PCT Pub. No.: WO2005/064467

PCT Pub. Date: Jul. 14, 2005

(65) Prior Publication Data

US 2007/0277183 A1    Nov. 29, 2007

(30) Foreign Application Priority Data

Dec. 26, 2003    (JP)    ............... 2003-435420

(51) Int. Cl.
G06F 3/00    (2006.01)
G06F 15/173    (2006.01)
(52) U.S. Cl. .................. 719/312; 709/203
(58) Field of Classification Search .......... 719/310, 719/312; 707/103; 709/203, 220
See application file for complete search history.

(56) References Cited

U.S. PATENT DOCUMENTS

| | | | |
|---|---|---|---|
| 6,138,141 A * | 10/2000 | DeSimone et al. | 709/203 |
| 6,430,570 B1 * | 8/2002 | Judge et al. | 707/103 R |
| 2002/0049719 A1 | 4/2002 | Shiomi et al. | |
| 2004/0205769 A1 * | 10/2004 | Ruutu | 719/313 |

FOREIGN PATENT DOCUMENTS

CN    1268859    10/2000

(Continued)

OTHER PUBLICATIONS

Office Action issued May 2, 2007 in Russian Patent Application No. 2006127036/09 (with translation).

(Continued)

*Primary Examiner*—Meng-Ai An
*Assistant Examiner*—Lechi Truong
(74) *Attorney, Agent, or Firm*—Brinks Hofer Gilson & Lione (57) ABSTRACT

In a communication terminal where a running application is not managed by an OS (operating system), a message is received without a communication connection being established, and if the message is destined for a running application, receipt of the message is notified to the running application. In mobile device MS, CPU 6 writes in key information area 73 of RAM 7 key information for identifying a Java application which is being run using KVM program 84, using OS software 82 and JAM program 86 stored in nonvolatile memory 8. CPU 6, when receiving a SMS message, and further if a content of the message matches the key information written in key information area 73, writes information that the message has been received in an area reserved in RAM 7 for the running Java application.

15 Claims, 5 Drawing Sheets

FOREIGN PATENT DOCUMENTS

| | | |
|---|---|---|
| GB | 2365168 A | 2/2002 |
| JP | H06-175831 | 6/1994 |
| JP | H09-8946 | 1/1997 |
| JP | 2000-250758 | 9/2000 |
| JP | 2002-259146 | 9/2002 |
| RU | 2210865 C1 | 8/2003 |

OTHER PUBLICATIONS

Pershikov, V.I., et al, "Tolkovy Slovar po Informatike", Moscow, Finansy i Statistika, 1991, 543pp. p. 371, p. 157.

Office Action issued Oct. 31, 2007, in Russian Patent Application No. 2006127036/09 (with translation).

Office Action from the Egyptian Patent Office in the corresponding Egyptian patent application dated Aug. 21, 2007, (with full translation) (Four (4) pgs.).

Office Action issued Sep. 2, 2008, in Japanese Patent Application No. 2003-435420) (with English language translation), 6 pgs.

Kenichi Mori, Mechanism of 3G cellular phone (17), Nikkei Communication, Japan, Nikkei BP, Dec. 2, 2002, vol. 379, pp. 128, 129 (4 pgs).

Office Action issued Jul. 29, 2008, in Russian Patent Application No. 2006127036/09(029350) (with English language translation), 13 pgs.

* cited by examiner

COMMUNICATION TERMINAL AND PROGRAM THEREFOR

TECHNICAL FIELD

The present invention relates to a technique of receiving a message in a communication terminal and notifying receipt of the message to a running application.

BACKGROUND ART

In Japan, there is provided a service whereby a mobile device, comprising a WWW (World Wide Web) browser and a Java (registered trademark) virtual machine, is caused to download from a server connected to the Internet an application program written in Java language, to store the application program, and to execute the application program using the Java virtual machine.

In using this service, if operations during running of a Java application can be changed in response to a push message received from a server connected to the Internet, a range of the service provided can be expanded. However, to expand the range of the service it is necessary to be able to notify to a running Java application receipt of a message that is destined for the running Java application. Among techniques of notifying to an application that a communication terminal has received a message from a server are those described in JP2002-132693, JP2002-344529, and JP2003-134566.

In the technique described in JP2002-132693, a chat server, when receiving background image data during a chat session, notifies receipt of the background image data to a client machine running a Java applet during a chat session. On receipt of the notification, the Java applet downloads the background image data from the chat server and displays it. However, this service can be realized only after a communication connection has been established between the chat server and the client machine. In contrast, in services other than those based on a communication connection such as a chat service, it is not practical to establish a communication connection between a mobile device and a server each time the server sends a message. Also, a Java applet is executed by using a WWW browser, not by using a Java virtual machine. In view of such issues, using the technique described in JP2002-132693 for expanding a range of service is problematic.

In the technique described in JP2002-344529, a push server sends to a user terminal a message including identification information of an application to be executed and an execution option for the application. On receipt of the message, the user terminal, if loaded with software required for the execution of the application, executes the application using the execution option included in the message. However, this technique is not used for changing operations of a running application, but rather for executing a pre-execution application. Also, in using the above-mentioned service, a Java application running in a mobile device is recognized not by an OS (Operating System) but by a Java virtual machine. An OS is only able to recognize a Java virtual machine that is running. In contrast, the technique described in JP2002-344529 is based on a precondition that an application is able to be recognized by an OS. As is clear from the preconditions outlined above, it will be appreciated that using this technique for expanding a range of the above-mentioned service is problematic.

In the technique described in JP2003-134566, a call server, upon request of a WWW server, calls a mobile terminal using a technique called "Wake On Ring" and sends data to the mobile terminal. The mobile terminal, when called by the call server, identifies an application for using the data on the basis of information included in the call. The identified application connects to the WWW server and requests delivery of the data. However, since this technique is also based on a precondition that an application is able to be recognized by an OS, using this technique for expanding the range of the above-mentioned service is problematic, for the same reason as discussed in relation to the technique described in JP2002-344529.

The present invention has been made in view of the circumstances stated above, and provides a technique of receiving, in a communication terminal where running applications are not managed by an OS, a message from a device without establishing a communication connection with the device, and if the received message is destined for a running application, notifying receipt of the message to the running application.

SUMMARY OF THE INVENTION

The present invention provides a communication terminal comprising: first storing means for storing a system program necessary for execution of a program, a parent program, and a management program for managing an execution of a program which is performed by using the parent program; second storing means for storing a child program; child program executing means for executing the child program stored in the second storing means by using the system program and the parent program; management program executing means for executing the management program by using the system program; third storing means which is a work area for the child program which is executed and caused to run by the child program executing means; fourth storing means which is accessed by the management program executing means; first writing means for writing in the fourth storing means key information for identifying the child program which is executed and caused to run by the child program executing means by using the system program and the management program; receiving means for receiving a message via a communication network; and second writing means for, in a case that a content of a message received by the receiving means matches key information stored in the fourth storing means, writing in the third storing means information that the message has been received, by using the system program and the management program.

Also, the present invention provides a program for causing a computer to function as: first writing means for writing in a storage area key information for identifying a child program which is being run using a system program and a parent program; second writing means for, if a content of a received message matches key information written in the storage area, writing information that the message has been received in a storage area for the running child program.

According to the communication terminal or a computer where a program is executed, key information for identifying a child program which is being run using the system program and its parent program; and if the key information matches a content of a received message, information that the message has been received is written in a storage area for the child program. The written information is used by an application realized upon execution of the child program.

According to the present invention, it becomes possible, in a communication terminal where running applications are not managed by using a system program, to receive a message from a device without establishing a communication connection with the device, and if the received message is destined for a running application, to notify the receipt of the message to the running application.

DESCRIPTION OF THE PREFERRED EMBODIMENTS

Below, with reference to the drawings, an embodiment of the present invention will now be described.

[Configuration]

Figure 1:
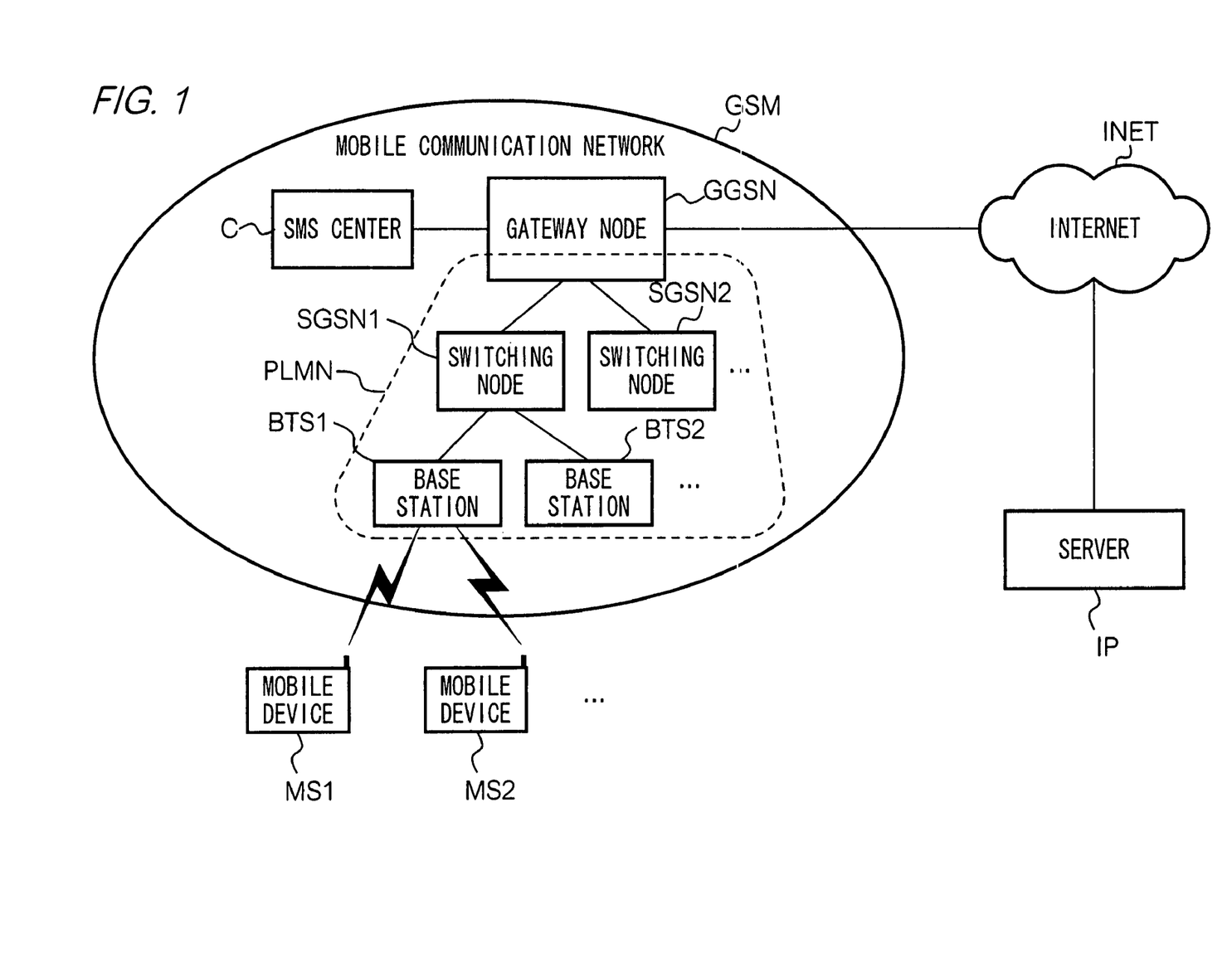
FIG. 1 is a diagram showing a configuration of a communication system using a mobile device according to an embodiment of the present invention.

FIG. 1 is a diagram showing a communication system using a mobile device according to an embodiment of the present invention. Mobile communication network GSM is a mobile communication network which adheres to GSM (Global System for Mobile Communications) technology, and provides a voice or data communication service to a mobile device of a user who is under a communication service contract with a communication carrier operating mobile communication network GSM. In FIG. 1, as the contracting mobile device, mobile devices MS1 and MS2 are illustrated.

Among services provided by mobile communication network GSM is a SMS (Short Message Service). The SMS is a push short message service, and complies with the standards of the ETSI (European Telecommunications Standards Institute) and the WAP (Wireless Application Protocol). The SMS is also a center-system short message service. To provide the service, mobile communication network GSM comprises SMS center (service center) C for creating and sending a SMS message, where a telephone number is designated as a destination address and whose size is limited (for example, 160 characters). Mobile communication network GSM also comprises switching network PLMN which can transfer a SMS message to a mobile device served by mobile communication network GSM.

Also, among services provided by mobile communication network GSM is a GPRS (General Packet Radio Service). The GPRS is a service for providing high-speed and general-purpose packet communication via a mobile communication network. To provide the service, mobile communication network GSM comprises a plurality of switching nodes such as gateway node GGSN and switching nodes SGSN1 and SGSN2. Mobile communication network GSM also comprises a plurality of base stations such as base stations BTS1 and BTS2, and a location register which is not shown. The gateway node, the switching nodes, the base stations, and the location register together constitute the switching network PLMN. In the following, each of base stations BTS1 and BTS2 is referred to as "base station BTS", except where it is necessary to specify them otherwise. Similarly, the terms "switching node SGSN" and "mobile device MS" are used accordingly.

Gateway node GGSN and switching node SGSN are each switching nodes for routing a packet. Gateway node GGSN is connected to switching node SGSN, and switching node SGSN is connected to base station BTS. Switching node SGSN routes a packet addressed to mobile device MS served thereby to mobile device MS, and routes a packet from mobile device MS served thereby to a destination. Switching node SGSN may be connected to base station BTS served thereby via another switching node SGSN. Gateway node GGSN routes a packet addressed to mobile device MS served thereby to switching node SGSN serving mobile device MS, and routes a packet from switching node SGSN served thereby to a destination. Gateway node GGSN is also a gateway node for connecting mobile communication network GSM with a public network such as Internet INET. Accordingly, mobile device MS can conduct packet communication through Internet INET.

Gateway node GGSN is also connected to SMS center C. SMS center C, when requested via Internet INET and gateway node GGSN to send a SMS message addressed to mobile device MS, creates the SMS message and sends the created SMS message to gateway node GGSN. When the SMS message is sent, the SMS message is transferred to mobile device MS via gateway node GGSN, switching node SGSN, and base station BTS which constitute switching network PLMN.

Internet INET is connected to server IP as shown in FIG. 1. Server IP is a WWW server, and in response to a download request from mobile device MS, sends a Java application executable in mobile device MS. The Java application is designed so that operations thereof can be changed in response to a trigger from server IP, as described later.

A Java application is downloaded as a JAR file (Java ARchive file) containing a class file and a data file for executing the Java application, from a predetermined URL of server IP to mobile device MS. To the JAR file, an AD (Application Descriptor) file is attached where information on the name of the Java application and a URL where the AD file has been stored are described.

Figure 2:
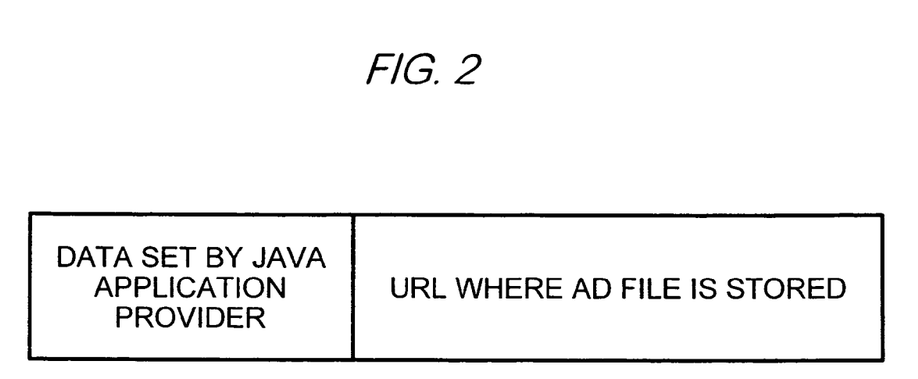
FIG. 2 is a diagram showing a typical data structure of key information in the communication system.

Server IP, which provides the above download service of a Java application to mobile device MS, records the telephone number of mobile device MS which has downloaded a Java application. As an example, server IP may cause mobile device MS to describe its telephone number in a download request, and upon receipt of the download request, read from the download request the telephone number of mobile device MS and record it. After that, if a predetermined condition is met or if predetermined information is received form the outside, server IP communicates with SMS center C via Internet INET and gateway node GGSN, and requests SMS center C to send a SMS message addressed to the telephone number of mobile device MS which has downloaded the Java application. The send request contains the telephone number of mobile device MS and key information corresponding to each Java application. The key information, as shown in FIG. 2, is composed of data (a byte array) set by a Java application provider arbitrarily and a URL where an AD file of a Java application for downloading has been stored. A reason why a URL of an AD file is contained in key information is that if only arbitrarily set data is used, the same key information may be accidentally set for a plurality of Java applications.

Figure 3:
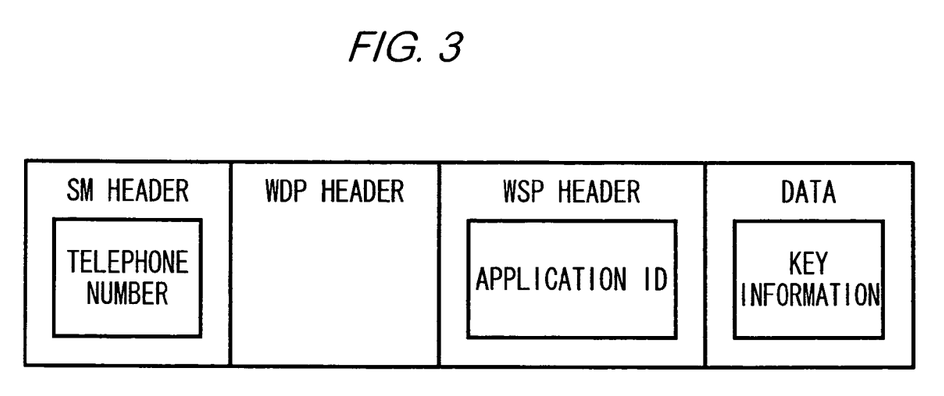
FIG. 3 is a diagram showing a data structure of a SMS message in the communication system.

FIG. 3 is a diagram showing a data structure of a SMS message created in SMS center C in response to a send request from server IP. As shown in FIG. 3, the SMS message is composed of key information contained in a send request from server IP, and a WSP header, a WDP header, and an SM header attached to the key information. The SMS header contains a telephone number contained in a send request from server IP. The WSP header contains an application ID, which is identification information for identifying an application in a device to which a received SMS message is to be passed, and which is assigned uniquely within a network (in the present embodiment, mobile communication network GSM) where SMS messages are usable. Server IP records an application ID assigned to a JAM (Java Application Manager) launched in mobile device MS, and using the application ID executes the send request referred to above. A data field of the SMS message contains key information shown in FIG. 2.

Figure 4:
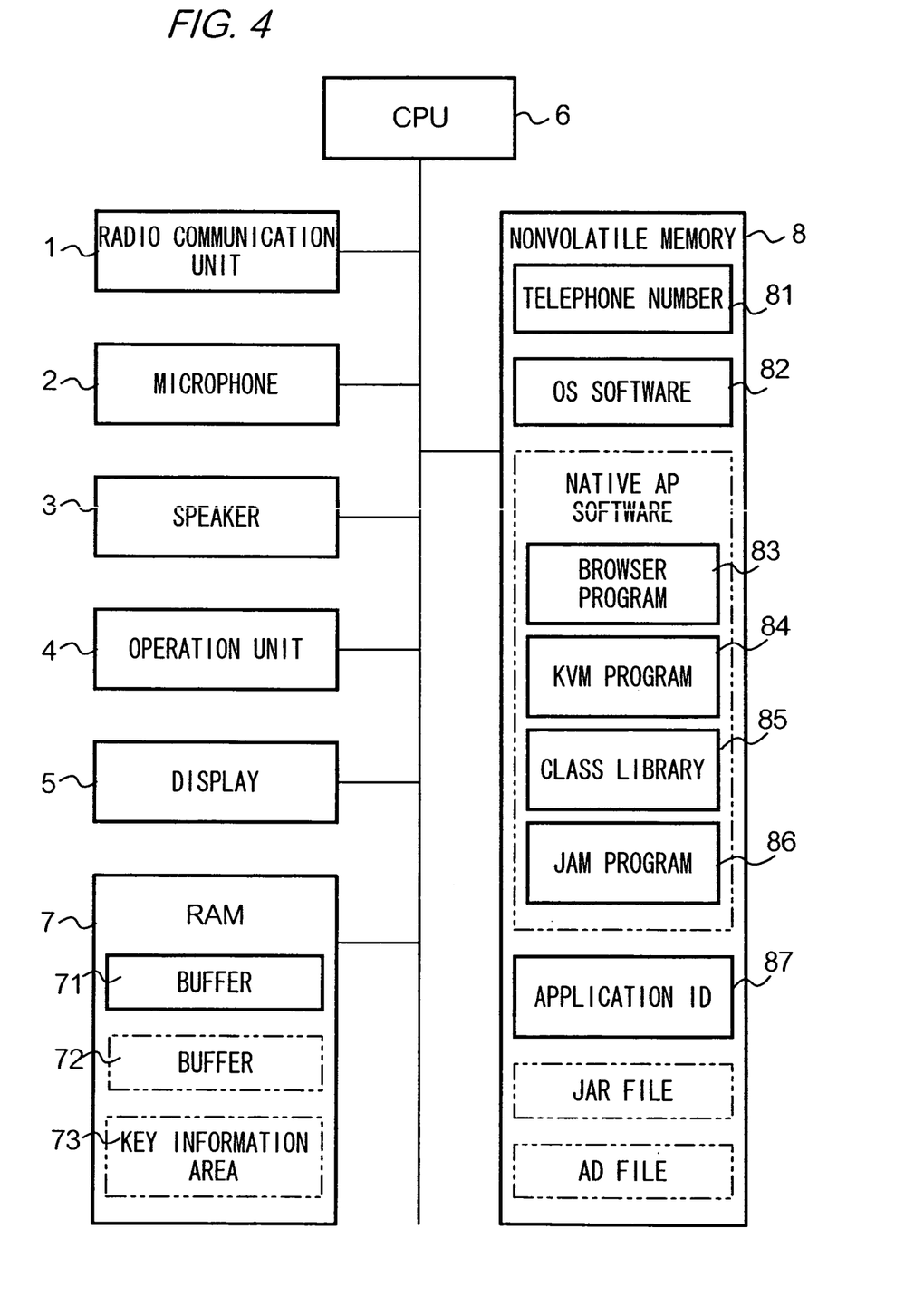
FIG. 4 is a block diagram showing a static configuration of mobile device MS constituting the communication system.

FIG. 4 is a block diagram showing a static configuration of mobile device MS. As shown in FIG. 4, mobile device MS, as commonly used mobile phones, comprises radio communication unit 1 for communicating with base station BTS wirelessly, microphone 2 for inputting voice, speaker 3 for outputting sound such as voice, operation unit 4, and display 5 for displaying an image.

Mobile device MS also comprises CPU 6 (child program executing means and management program executing means), RAM 7 (third and fourth storing means) for providing a work area to CPU 6, and nonvolatile memory 8 (first and second storing means) which is read or written by CPU 6. Nonvolatile memory 8 stores telephone number 81 of mobile device MS and OS software 82 (system program). CPU 6, when mobile device MS is powered on, reads and executes OS software 82, and controls the components stated above. In view of the above, mobile device MS can be considered as being a computer. It should be noted that since functions particular to the present invention are realized only while OS software 82 is being run by CPU 6, the following descriptions are made based on a precondition that OS software 82 is being run by CPU 6. Nonvolatile memory 8 may be flash memory which is nonvolatile and also readable/writable.

Figure 5:
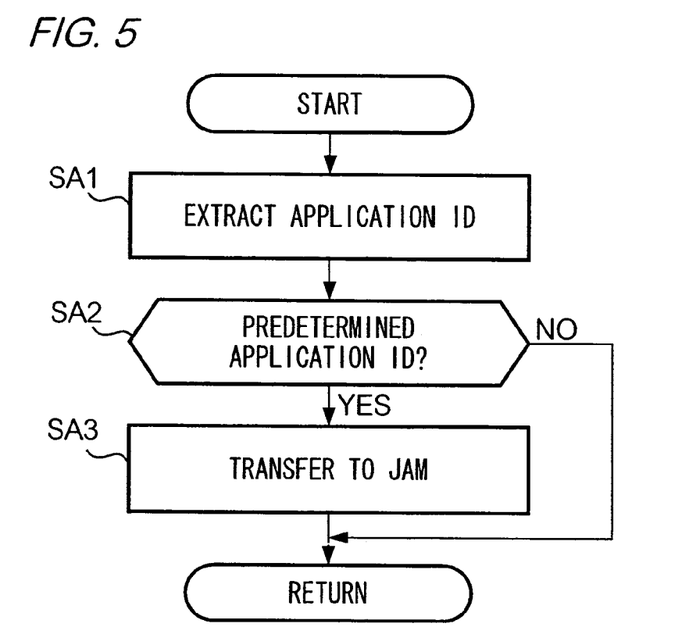
FIG. 5 is a flowchart showing operations that mobile device MS carries out using OS software 82.

CPU 6, when receiving a SMS message using radio communication unit 1, compares a destination address contained in a SM header of the SMS message and telephone number 81 stored in nonvolatile memory 8. If they do not match, CPU 6 discards the SMS message. On the other hand, if they do match, CPU 6 writes the SMS message in buffer 71 in RAM 7 and proceeds with following operations as shown in FIG. 5. CPU 6 extracts an application ID from a WSP header of the SMS message, and compares the extracted application ID and application ID 87 of a JAM stored in nonvolatile memory 8. If they match, CPU 6 writes a data part of the SMS message in buffer 72 reserved in RAM 7. However, if buffer 72 has not been reserved in RAM 7, CPU 6 does not perform any action with respect to the SMS message.

Nonvolatile memory 8 stores a plurality of native application programs. A native application program is an application program which is written in machine language for use by CPU 6, and which has been pre-stored in nonvolatile memory 8 before mobile device MS is sold. Nonvolatile memory 8 stores as a native application program browser program 83 for causing mobile device MS to function as a WWW browser; KVM program 84 (parent program) for causing mobile device MS to function as a Java virtual machine; class library 85 required for the Java virtual machine to execute a Java application program; and JAM program 86 (management program) for causing mobile device MS to function as a JAM managing the start and the termination of a Java application. KVM program 84 and class library 85, which is designed to run in a mobile terminal with limited resources, has been developed based on a commonly used VM program and class library.

CPU 6, when instructed by using operation unit 4 to launch a WWW browser, reads browser program 83 from nonvolatile memory 8 and executes it. CPU 6 running browser program 83 can communicate with a WWW server via mobile communication network GSM and Internet INET. Also, CPU 6 running browser program 83, when instructed by operation unit 4 to download a Java application, downloads a JAR file and an AD file of the Java application from a server and writes them in nonvolatile memory 8, and reads telephone number 81 stored in nonvolatile memory 8 and sends it to the server.

CPU 6, when instructed by operation unit 4 to launch a JAM, reads JAM program 86 from nonvolatile memory 8 and executes it, and reserves buffer 72 and key information area 73 in RAM 7. Subsequently, CPU 6 proceeds with the following operations using JAM program 86 unless otherwise specified. CPU 6 extracts character strings representing names and URLs from AD files of all Java applications stored in nonvolatile memory 8, and displays in display 5 a list of the names of the Java applications represented by the character strings. When a name in the list is selected by using operation unit 4 and the launch of a Java application corresponding to the name is instructed by using operation unit 4, CPU 6 extracts from an AD file of the Java application, a URL where the AD file has been stored, and combines the URL and "0" values of the length of character strings set by a provider of the Java application and writes it in key information area 73. CPU 6 executes KVM program 84, and by using KVM program 84 launches the Java application. At this time, if the Java application is designed for operation control triggered by the receipt of a SMS message, the "0" values written in key information area 73 are replaced with a data set by a provider of the Java application. At the same time, CPU 6 reserves a storage area (not shown) for the Java application in RAM 7. When the Java application is terminated, CPU 6 deletes the key information from key information area 73, releases the storage area for the Java application, and terminates KVM program 84.

Figure 6:
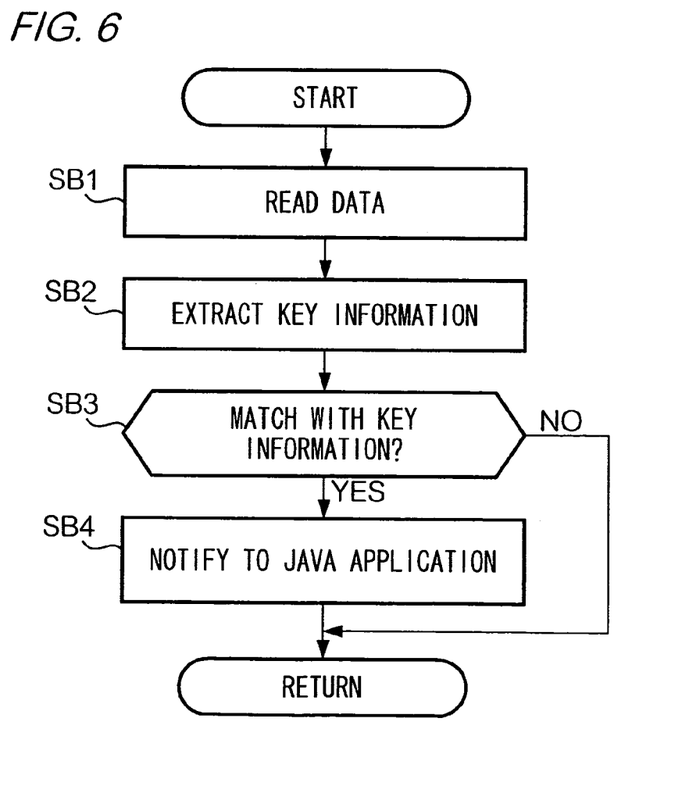
FIG. 6 is a flowchart showing operations that mobile device MS carries out using JAM program 86.

CPU 6, as shown in FIG. 6, when data is written in buffer 72, extracts key information from the data, and by comparing the extracted key information and key information written in key information area 73 of RAM 7, determines whether they match. If CPU 6 determines that they match, CPU 6 writes notification information in a storage area for the Java application to the effect that a SMS message has been received that is addressed to a running Java application. If it is determined that they do not match, CPU 6 takes no action with respect to a received SMS message.

[Operation]

Below, operations of the communication system discussed above will be described.

First, operations for downloading a Java application program will be described.

In mobile device MS1, when instructed by using operation unit 4 to launch a WWW browser, CPU 6 reads browser program 83 from nonvolatile memory 8 and executes it. Consequently, the WWW has been launched in mobile device MS1. After that, when instructed by using operation unit 4 to download a Java application from server IP, CPU 6 communicates with server IP via mobile communication network GSM and Internet INET, downloads a JAR file and an AD file of the Java application from server IP, and writes them in nonvolatile memory 8. At this time, CPU 6 reads telephone number 81 stored in nonvolatile memory 8 and sends it to server IP. Telephone number 81 is recorded in server IP as a destination address of a SMS message.

Second, operations of launching a Java application will be described.

Figure 7:
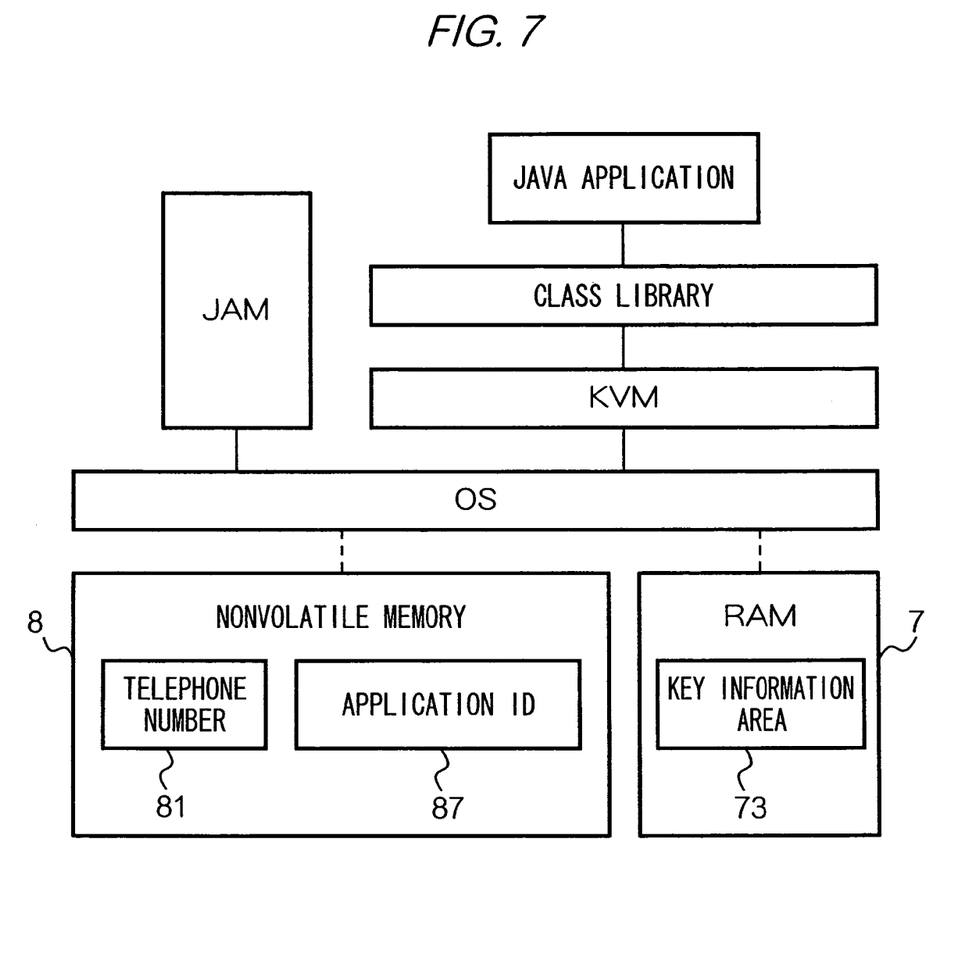
FIG. 7 is a block diagram showing a dynamic configuration of mobile device MS.

CPU 6 of mobile device MS1, when instructed by using operation unit 4 to launch a JAM, reads JAM program 86 stored in nonvolatile memory 8 and executes it. Subsequently, using JAM program 86 CPU 6 proceeds with following operations. CPU 6 extracts character strings representing names and URLs from AD files of all Java applications stored in nonvolatile memory 8, and displays in display 5 a list of the names of the Java applications represented by the character strings. When a name in the list is selected by using operation unit 4 and the launch of a Java application corresponding to the name is instructed by using operation unit 4, CPU 6 extracts from an AD file of the Java application, an URL where the AD file has been stored, and combines the URL and "0" values of the length of character strings set by a provider of the Java application and writes it in key information area 73 reserved in RAM 7. CPU 6 executes KVM program 84, and using KVM program 84 launches the Java application. At this time, if the Java application is designed for operation control triggered by the receipt of a SMS message, the "0" values written in key information area 73 are replaced with a data set by a provider of the Java application. At the same time, CPU 6 reserves a work area for the Java application in RAM 7. As a result, as shown in FIG. 7, a KVM has been launched, and on the KVM the Java application has been launched. When the Java application is terminated by CPU 6, CPU 6 deletes the key information from key information area 73, terminates KVM program 84, and releases the storage area for the Java application reserved in RAM 7.

Third, operations of providing a trigger from server IP to a Java application which has been downloaded to mobile device MS1 and is running will be described. In the following descriptions, it is assumed that in mobile device MS1, a JAM is running and buffer 72 has been reserved in RAM 7. Server IP, if a predetermined condition is met or predetermined information is received form the outside, sends to SMS center C via Internet INET and gateway node GGSN, a request to send a SMS message addressed to mobile device MS 1 which has downloaded a Java application. The send request contains the telephone number of mobile device MS1, the application ID of the JAM launched in mobile device MS1, and key information.

Upon receipt of the send request, SMS center C creates a SMS message having the data structure as shown in FIG. 3 and sends it to gateway node GGSN. Since a SM header of the SMS message contains the telephone number of mobile device MS1 as a destination address, the SMS message is sent via switching network PLMN and a wireless area to CPU 6 of mobile device MS1. CPU 6 writes the received SMS message in buffer 71 of RAM 7, and extracts the application ID from a WSP header of the SMS message (Step SA1 in FIG. 5). If the extracted application ID differs from application ID 87 stored in nonvolatile memory 8, CPU 6 determines that the SMS message is not destined for a Java application, and takes no action with respect to the SMS message (Step SA2: NO). However, in this operation example, since the extracted application ID and application ID 87 match, CPU 6 writes data part of the SMS message in buffer 72 (Step SA2: YES and SA3). The data part is shown in FIG. 3.

Subsequently, CPU 6 proceeds with the following operations using JAM program 86. CPU 6 reads the data written in buffer 72 (Step SB1 in FIG. 6), and extracts key information from the data (Step SB2). The extracted key information is shown in FIG. 2.

CPU 6 compares the extracted key information and key information written in key information area 73 of RAM 7 to determine whether they match (Step SB3). The determination depends on a Java application running at this time. If a Java application running at this time is a Java application to which server IP intends to provide a trigger, the same key information as that of the SMS message must have been written in key information area 73. Accordingly, both key information match and the determination becomes affirmative (Step SB3: YES).

When the determination is affirmative, to notify that a SMS message has been received addressed to a running Java application to the running Java application, CPU 6 writes notification information in a storage area for the Java application reserved in RAM 7 (Step SB4). In response to the notification, operations of the running Java application can be changed.

On the other hand, at the determination of Step SB3, if the running Java application is not a Java application to which server IP intends to provide a trigger, or if no Java application is running, key information different from that of the Java application to which server IP intends to provide a trigger must have been written, or nothing must have been written in key information area 73. Accordingly, the determination becomes negative (Step SB3: NO). When the determination is negative, CPU 6 takes no action with respect to the SMS message.

As described above, in the present embodiment, CPU 6, using OS software 82 and JAM program 86 stored in nonvolatile memory 8, writes in key information area 73 of RAM7, key information for identifying a Java application which is being run using KVM program 84. CPU 6, if a SMS message is received and key information contained in the SMS message matches the key information in key information area 73, writes information for notifying the receipt of the SMS message in a storage area for a running Java application reserved in RAM 7. According to the foregoing, in mobile device MS where running Java applications are not managed by an OS, it becomes possible to receive a SMS message from server IP without establishing a communication connection with server IP, and if the SMS message is destined for a running Java application, notify the application of the receipt of the SMS message.

In the present embodiment, receipt of a message is not notified to an application for which the message is not destined. Accordingly, the embodiment is suitable for a mobile device having an environment requiring a certain level of security such as Java Runtime Environment. In the present embodiment, key functions of mobile device MS in the embodiment are realized using JAM program 86. Accordingly, the key functions can be provided to existing mobile devices, only by distributing JAM program 86 to the mobile devices and replacing existing JAM program in the mobile devices with JAM program 86.

In the present embodiment, a Java application is downloaded from server IP, and a JAR file and an AD file of the Java application are written in nonvolatile memory 8. From the JAR file and the AD file stored in nonvolatile memory 8, key information is extracted for use in comparison with that of a SMS message. Therefore, the key information for use in comparison with that of a SMS message can be specified arbitrarily by a provider of the Java application. However, if this feature is not desired, key information can be specified to the Java application in a fixed manner, and the fixed specified key information can be used for comparison with the SMS message.

In the present embodiment, only when an application ID in a WSP header of a received SMS message matches an application ID assigned to a JAM, a comparison of key information is conducted. Accordingly, if a SMS message is received destined for an application other than a Java application, receipt thereof can be appropriately notified to the application. However, if applications launched in mobile device MS are Java applications only, the comparison of application IDs may be omitted, and only the comparison of key information may be conducted.

In the present embodiment, by containing key information in a SMS message in addition to an application ID, a Java application for which the SMS message is destined can be identified in mobile device MS. As stated above, since in the present embodiment, an application is provided with a trigger using a SMS which is popular as a push message service in mobile communication services, implementation for a mobile device is easy. In the present embodiment, in addition to the key information, parameter information for controlling operations of a Java application may be passed to the Java application, and thereby enabling a variety of control operations of the Java application.

In the present embodiment, notification information may be notified to a Java application using a common interrupt function provided by a KVM and a class library. However, even in this case, the notification information is written in a storage area in RAM 7 reserved for the Java application, although it is separated from that for parameter information.

In the present embodiment, when launching a Java application, CPU 6 voluntarily writes key information in key information area 73 using JAM program 86. However, CPU 6 may writes key information in key information area 73 upon request of the launched Java application.

In the present embodiment, a Java application is downloaded by downloading two files. However, a method of downloading a Java application is not limited to the above download method. In essence, any download method can be adapted, where information contained in the two files is provided to a mobile device, and managed in the mobile device in association with a Java application.

In the present embodiment, an application to which a trigger is provided is not limited to a Java application. In essence, the present invention can be applied to any environment where a child application (for example, a Java application) is launched on a condition that a parent application (for example, a KVM) has been launched, and where the launch of a child application is not recognized.

In the present embodiment, a telephone function may be removed from mobile device MS. The present invention may be applied to a mobile device served by a mobile communication network adhering to a different communication technology, and to a communication terminal connected to a fixed communication network. In essence, the present invention can be applied to any mobile device capable of packet communication via a communication network.

The invention claimed is:

1. A communication terminal comprising:
a first memory configured to store a system program, a parent program, and a management program, wherein the system program is executable to manage execution of both the parent program and the management program, and wherein each of the system program, the parent program, and the management program are stored in the first memory as computer program code executable with a processor;
the processor further configured to download, from a server, a child program and key information, wherein the key information includes a byte array and a uniform resource locator address, wherein the uniform resource locator address identifies a location of the child program on the server;
the processor further configured to store the child program and the key information into the first memory in association with each other, wherein the management program is executable to manage execution of the child program, and wherein execution of the child program is a function of the parent program;
a second memory in communication with the processor, wherein the second memory includes a work area for the child program;
the processor further configured to read the key information from the first memory, and the processor further configured to store the key information associated with the child program in the second memory as a function of the system program and the management program during execution of the child program;
a receiver in communication with the processor, the receiver configured to receive a message via a communication network; and
the processor further configured to determine that a content of the message matches the key information stored in the second memory as a function of the system program and the management program, and based upon determination that the content of the message matches the key information stored in the second memory, the processor further configured to write a message received indication in the work area.

2. The communication terminal of claim 1, wherein:
the communication network is a mobile communication network;
the processor is further configured to determine that the message includes a telephone number of the communication terminal; and
the communication terminal is further configured to receive the message based upon determination that the message includes the telephone number of the communication terminal.

3. The communication terminal of claim 1, wherein the key information identifies the child program to the management program during the execution of the child program by the processor.

4. The communication terminal of claim 1, wherein the child program is unmanaged by the system program.

5. A communication terminal comprising:
a first memory configured to store a system program, a parent program, and a management program, wherein the system program is executable to manage execution of both the parent program and the management program, and wherein each of the system program, the parent program, and the management program are stored in the first memory as computer program code executable with a processor;
the first memory further configured to store a child program, wherein the management program is executable to manage execution of the child program, and wherein execution of the child program is a function of the parent program;
a second memory in communication with the processor, wherein the second memory includes a work area for the child program;
the processor further configured to store the key information associated with the child program in the second memory as a function of the system program and the management program, wherein the key information includes a byte array and a uniform resource locator address;

a receiver in communication with the processor, the receiver configured to receive a message via a communication network;

the processor further configured to determine that a content of the message matches the key information stored in the second memory as a function of the system program and the management program, and based upon determination that the content of the message matches the key information stored in the second memory, the processor further configured to write a message received indication in the work area; and wherein:

the parent program comprises a JAVA virtual machine;

the child program is a JAVA application program; and the processor is further operable to execute the child program stored in the first memory in the Java virtual machine as a function of the system program and the parent program.

6. A computer readable memory that embodies computer program code, wherein the computer program code is executable on a processor, the computer program code comprising:

computer program code for a system program, a parent program, and a management program stored in a first memory, wherein the system program is executable to manage execution of both the parent program and the management program;

computer program code to download, from a server, a child program and key information, wherein the key information includes a byte array and a uniform resource locator address, wherein the uniform resource locator address identifies a location of the child program on the server;

computer program code to store the child program and the key information into the first memory in association with each other, wherein the management program is executable to manage execution of the child program, and wherein execution of the child program is a function of the parent program;

computer program code to allocate a work area for the child program in a second memory;

computer program code to read the key information from the first memory;

computer program code to store the key information associated with the child program in the second memory as a function of the system program and the management program during execution of the child program;

computer program code to receive a message with a receiver in communication with the processor via a communication network;

computer program code to determine that a content of the message matches the key information stored in the second memory as a function of the system program and the management program;

computer program code to write a message received indication in the work area based upon determination that the content of the message matches the key information stored in the second memory; and wherein the memory includes the first memory and the second memory.

7. The computer readable memory of claim 6, wherein the child program is a JAVA application.

8. The computer readable memory of claim 6, wherein the parent program includes a virtual machine executable to execute run-time instructions; and wherein the child program includes run-time instructions executable by the virtual machine.

9. The computer readable memory of claim 6, wherein the system program is executable to manage the parent program; and wherein the child program is unmanaged by the system program.

10. A method for receiving a message with a communication terminal over a communication network, wherein the communication terminal includes a system program, a parent program, and a management program stored in a first memory, the method comprising:

the system program executing on the communication terminal to manage execution of both the parent program and the management program;

the communication terminal downloading, from a server, a child program and key information, wherein the key information includes a byte array and a uniform resource locator address, wherein the uniform resource locator address identifies a location of the child program on the server;

the communication terminal storing the child program and the key information into the first memory in association with each other, wherein the management program is executable to manage execution of the child program, and wherein execution of the child program is a function of the parent program;

the communication terminal allocating a work area for the child program in a second memory;

the communication terminal reading the key information from the first memory;

the communication terminal storing the key information associated with the child program in the second memory as a function of the system program and the management program during execution of the child program;

the communication terminal receiving the message via the communication network; and the communication terminal determining that a content of the message matches the key information stored in the second memory as a function of the system program and the management program;

the communication terminal writing a message received indication in the work area based upon determination that the content of the message matches the key information stored in the second memory.

11. The method of claim 10, further comprising:

the server receiving a request for a download of the child program over the communication network from the communication terminal, wherein the request includes the application identifier and a telephone number of the communication terminal;

the server storing the application identifier in association with the telephone number of the communication terminal and the child program; and the server sending the download of the child program over the communication network to the communication terminal in response to receipt of the application identifier and the telephone number.

12. The method of claim 10, wherein the content includes a trigger, the method further comprising:

the child program changing execution in response to the trigger.

13. The method of claim 10, wherein the application identifier is uniquely assigned to the application manager within the communication network.

14. The method of claim 10, wherein the child program is a JAVA based program;
   wherein the virtual machine includes a JAVA virtual machine; and
   wherein the application manager includes a JAVA application manager.

15. The method of claim 10, wherein the application manager initiating execution of the child program by the virtual machine further comprises:

the application manager initiating execution of the child program based upon receipt of a selection of the child program from a user interface of the communication terminal.

\* \* \* \* \*